(12) United States Patent
Klinstein et al.

(10) Patent No.: US 7,819,158 B2
(45) Date of Patent: Oct. 26, 2010

(54) ULTRASONIC PRESS USING SERVO MOTOR WITH INTEGRATED LINEAR ACTUATOR

(75) Inventors: Leo Klinstein, Glenview, IL (US); Paul Golko, Crystal Lake, IL (US); William E. Jurkowski, Wheaton, IL (US)

(73) Assignee: Dukane Corporation, St. Charles, IL (US)

( * ) Notice: Subject to any disclaimer, the term of this patent is extended or adjusted under 35 U.S.C. 154(b) by 803 days.

(21) Appl. No.: 11/800,562

(22) Filed: May 7, 2007

(65) Prior Publication Data

US 2007/0257087 A1 Nov. 8, 2007

Related U.S. Application Data

(60) Provisional application No. 60/798,641, filed on May 8, 2006.

(51) Int. Cl.
*B32B 41/00* (2006.01)

(52) U.S. Cl. ............... 156/358; 156/73.1; 156/73.4; 156/580.1

(58) Field of Classification Search .......... 156/73.1, 156/73.4, 358, 580.1; 228/1.1, 110.1, 111
See application file for complete search history.

(56) References Cited

U.S. PATENT DOCUMENTS

| | | | |
|---|---|---|---|
| 4,179,059 A | | 12/1979 | Chang et al. |
| 4,496,095 A | | 1/1985 | Renshaw et al. |
| 5,110,381 A | * | 5/1992 | Heckard et al. ............ 156/64 |

(Continued)

FOREIGN PATENT DOCUMENTS

DE 4120245 1/1992

(Continued)

OTHER PUBLICATIONS

PCT International Search Report for International Application No. PCT/US2007/011011 dated Feb. 28, 2008.

*Primary Examiner*—George R Koch, III
(74) *Attorney, Agent, or Firm*—Nixon Peabody LLP

(57) ABSTRACT

An ultrasonic welding system includes an ultrasonic welding stack mounted for linear movement and for applying a controlled force, speed, or a combination of force and speed to a first workpiece to press the first workpiece against a second workpiece to which the first workpiece is to be joined, and an electrically powered linear actuator coupled to the ultrasonic welding stack for moving the stack while applying a controlled force, speed, or a combination of force and speed to said stack, the actuator including an electrical servo motor producing rotational mechanical motion and an integrated converter for converting the rotational motion into linear motion. In one specific implementation, a controller is coupled to the linear actuator for controlling the force applied by said actuator to the ultrasonic welding stack, and a sensor is coupled to the servo motor for producing a signal related to the torque produced by the servo motor and supplying that signal to the controller. In a second specific implementation, a load cell is used for force feedback to the motion controller with a linear or rotary position feedback device used to provide position and velocity feedback to the motion controller. The controller controls the electrical power delivered to the servo motor so as to control the torque and speed outputs of the motor.

10 Claims, 11 Drawing Sheets

U.S. PATENT DOCUMENTS

| | | | |
|---|---|---|---|
| 5,295,700 A | 3/1994 | Crews et al. | |
| 5,491,372 A | 2/1996 | Erhart | |
| 5,557,154 A | 9/1996 | Erhart | |
| 5,706,627 A | 1/1998 | Kirka et al. | |
| 5,707,414 A | 1/1998 | Leidy | |
| 5,788,791 A | 8/1998 | Grewell | |
| 5,798,599 A | 8/1998 | Harwood | |
| 5,829,115 A | 11/1998 | Speller, Jr. et al. | |
| 5,880,580 A | 3/1999 | Johansen | |
| 6,118,095 A | 9/2000 | Nagano | |
| 6,450,393 B1 | 9/2002 | Doumanidis et al. | |
| 6,491,785 B1 * | 12/2002 | Sato et al. | 156/379.6 |
| 6,787,729 B2 | 9/2004 | Dugas et al. | |
| 6,828,522 B2 | 12/2004 | Hochhalter et al. | |
| 6,891,183 B2 | 5/2005 | Kitamura et al. | |
| 6,951,052 B2 | 10/2005 | Clew | |
| 6,965,091 B2 | 11/2005 | Terada et al. | |
| 6,984,921 B1 | 1/2006 | Kosterman | |
| 7,002,095 B2 | 2/2006 | Kato et al. | |
| 7,141,752 B2 | 11/2006 | Hochhalter et al. | |
| 2002/0038792 A1 | 4/2002 | Terada et al. | |
| 2004/0069750 A1 | 4/2004 | Kato et al. | |
| 2004/0241267 A1 | 12/2004 | Schultz | |
| 2005/0077855 A1 | 4/2005 | Hochhalter et al. | |
| 2005/0194491 A1 * | 9/2005 | Hatano | 242/608.8 |
| 2005/0241143 A1 * | 11/2005 | Mizuno et al. | 29/739 |
| 2005/0284559 A1 * | 12/2005 | Ripplinger et al. | 156/73.5 |

FOREIGN PATENT DOCUMENTS

| | | |
|---|---|---|
| DE | 4026711 | 2/1992 |
| EP | 0 421 019 | 4/1991 |

* cited by examiner

ULTRASONIC PRESS USING SERVO MOTOR WITH INTEGRATED LINEAR ACTUATOR

CROSS-REFERENCE TO RELATED APPLICATIONS

This application claims priority to U.S. Provisional Application Ser. No. 60/798,641 filed May 8, 2006.

FIELD OF THE INVENTION

The present invention related generally to presses for use in ultrasonic welding or other systems for vibratory joining of plastic parts.

SUMMARY OF THE INVENTION

In accordance with one embodiment of the present invention, ultrasonic welding apparatus is provided that comprises an ultrasonic welding stack mounted for linear movement and for applying a controlled force to a first workpiece to urge the first workpiece against a second workpiece to which the first workpiece is to be joined, and an electrically powered linear actuator coupled to the ultrasonic welding stack for moving the stack while applying a controlled force, speed, or a combination of force and speed to said stack, the actuator including an electrical servo motor producing rotational mechanical motion and an integrated converter for converting the rotational motion into linear motion.

In one specific implementation, a motion controller is coupled to the linear actuator for controlling the force applied by said actuator to the ultrasonic welding stack, and a torque sensor is coupled to the servo motor for producing a signal related to the torque produced by the servo motor and supplying that signal to the motion controller. The motion controller controls the electrical power delivered to the servo motor so as to control the torque output of the motor.

The integrated converter may include a lead screw mechanically coupled to the servo motor, and a follower unit mechanically coupled to the lead screw for producing the linear motion in response to rotational motion of the lead screw. The ultrasonic welding stack may include an electromechanical transducer for converting electrical energy to mechanical vibrations, a booster coupled to the transducer for amplifying the mechanical vibrations, and a welding horn coupled to the booster for applying the mechanical vibrations to the first workpiece while being pressed against the second workpiece.

BRIEF DESCRIPTION OF THE DRAWINGS

The invention will be better understood from the following description of preferred embodiments together with reference to the accompanying drawings, in which.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
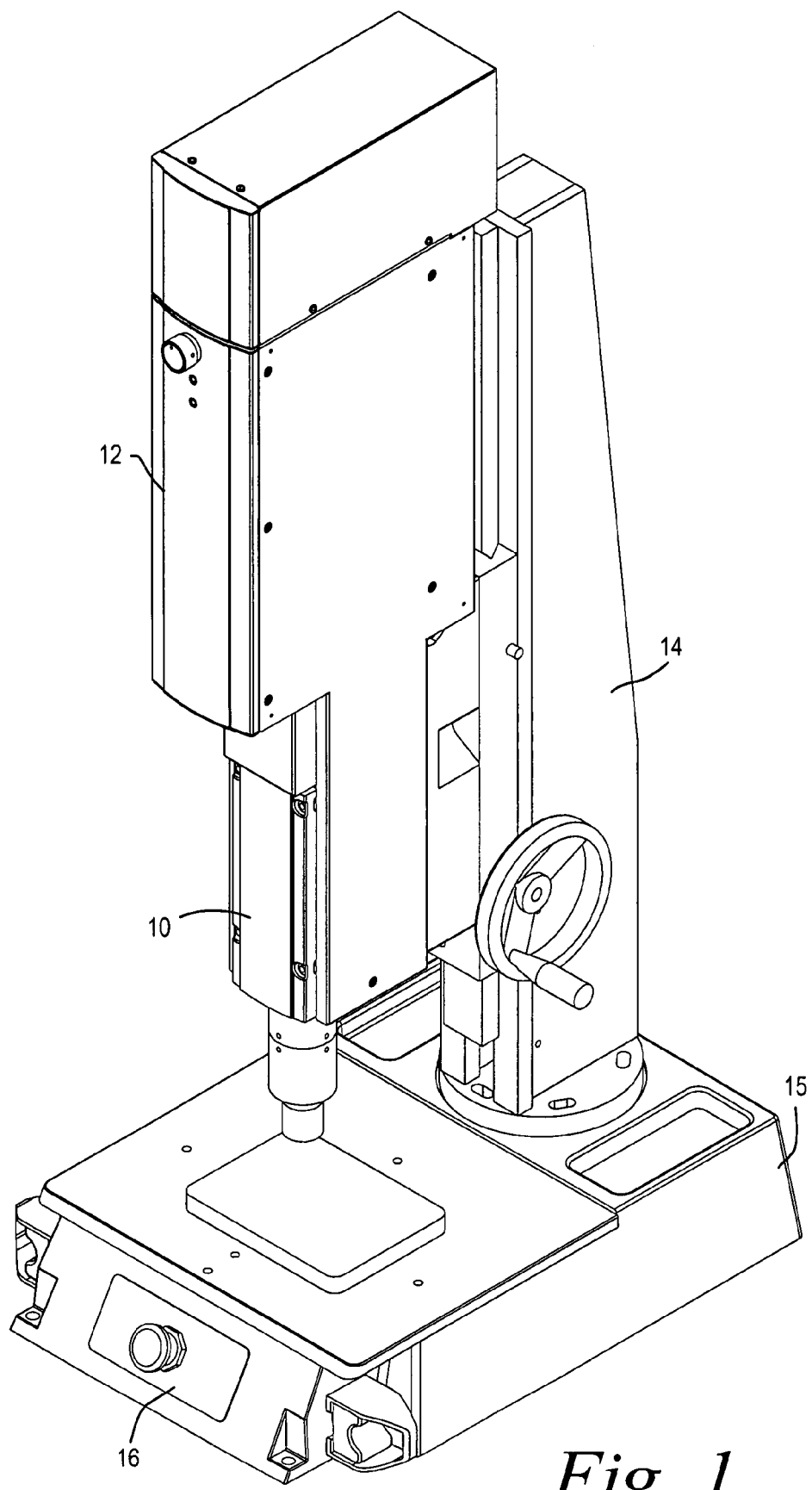
FIG. 1 is a front perspective view of an ultrasonic welding machine.
Figure 2:
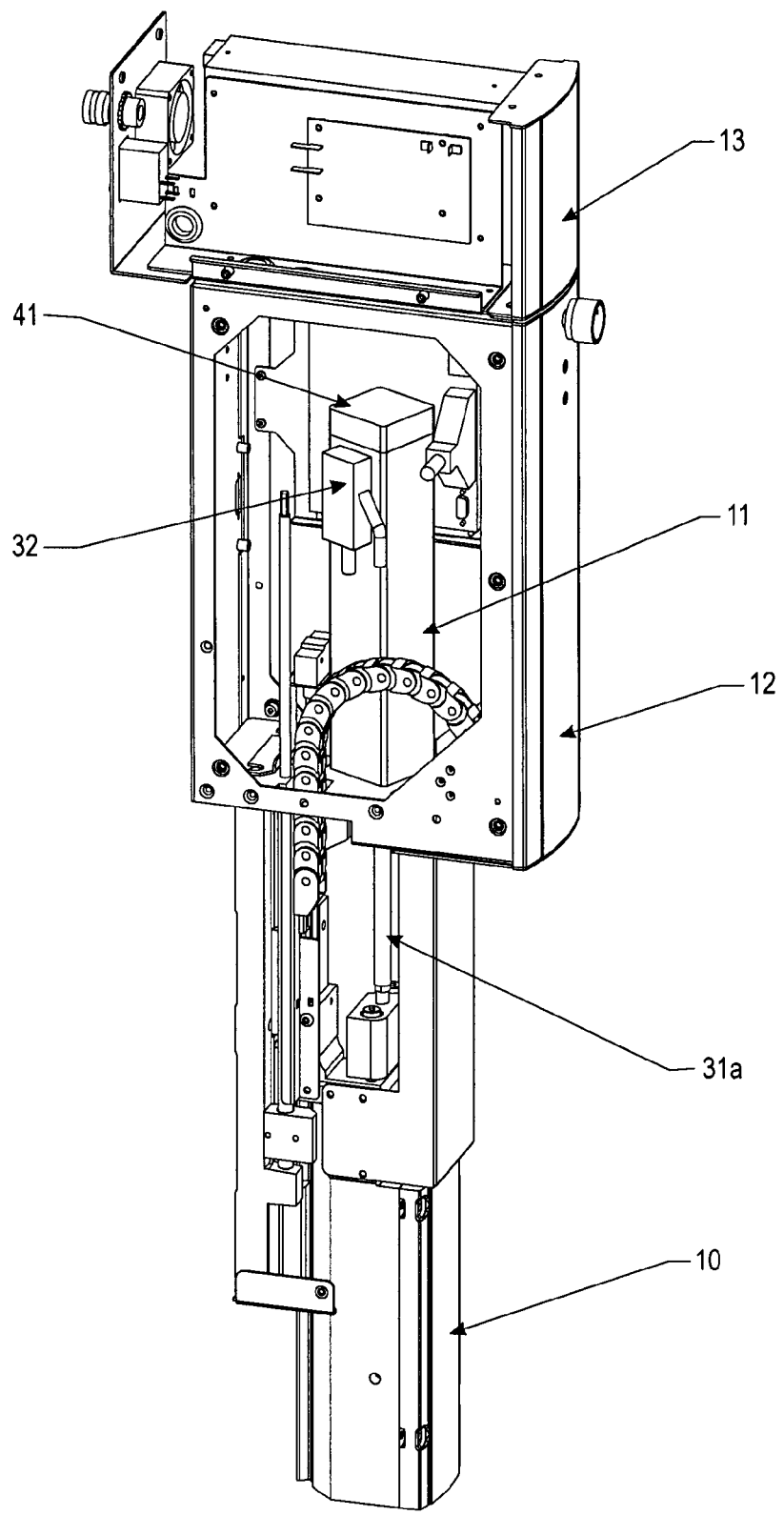
FIG. 2 is an enlarged side perspective of a portion of the ultrasonic welding machine shown in FIG. 1, with portions of the housing walls broken away to reveal the internal structure, including the linear actuator.

Turning now to the drawings and referring first to FIGS. 1-6, the illustrative ultrasonic welding machine includes an ultrasonic welding "stack" 10 that is mounted for controlled vertical movement by a bidirectional, electrically powered linear actuator 11 (FIG. 2). The stack 10 will be described in more detail below in connection with FIGS. 5 and 6. The actuator 11 is mounted within a main housing 12, which also supports an auxiliary housing 13 that contains the power supply and electronic controls for the welding press. In a variation of this concept, the housing 12 and auxiliary housing 13 may be combined into one structure without materially affecting the intent of this invention. The thermoplastic workpieces W1 and W2 (FIGS. 5 and 6) to be welded are mounted in a stationary fixture below the ultrasonic stack 10, and the actuator 11 advances the stack 10 downwardly against the upper workpiece W1. The lower end of the stack 10 is pressed downwardly against the workpiece W1 to press the upper workpiece W1 against the lower workpiece while applying mechanical vibrations to the workpiece W1 to effect the desired welding that joins the two workpieces W1 and W2 together.

The main housing 12 is mounted on a frame that includes a vertical post 14 extending upwardly from a base 15 that carries a fixture for receiving and supporting the workpieces to be welded. The housing 12 is typically adjustably mounted on the post 14 to allow the vertical position of the entire housing 12 to be adjusted for different workpieces. A control panel 16 is provided on the front of the base 15.

The ultrasonic welding stack 10 includes the following three components (see FIGS. 5 and 6):

1. An electromechanical transducer 20 which converts electrical energy into mechanical vibrations.
2. A booster 21 to alter the gain (i.e., the output amplitude) of the mechanical vibrations produced by the transducer 20.
3. A horn 22 to transfer the mechanical vibrations from the booster 21 to the parts to be welded.

Figure 5:
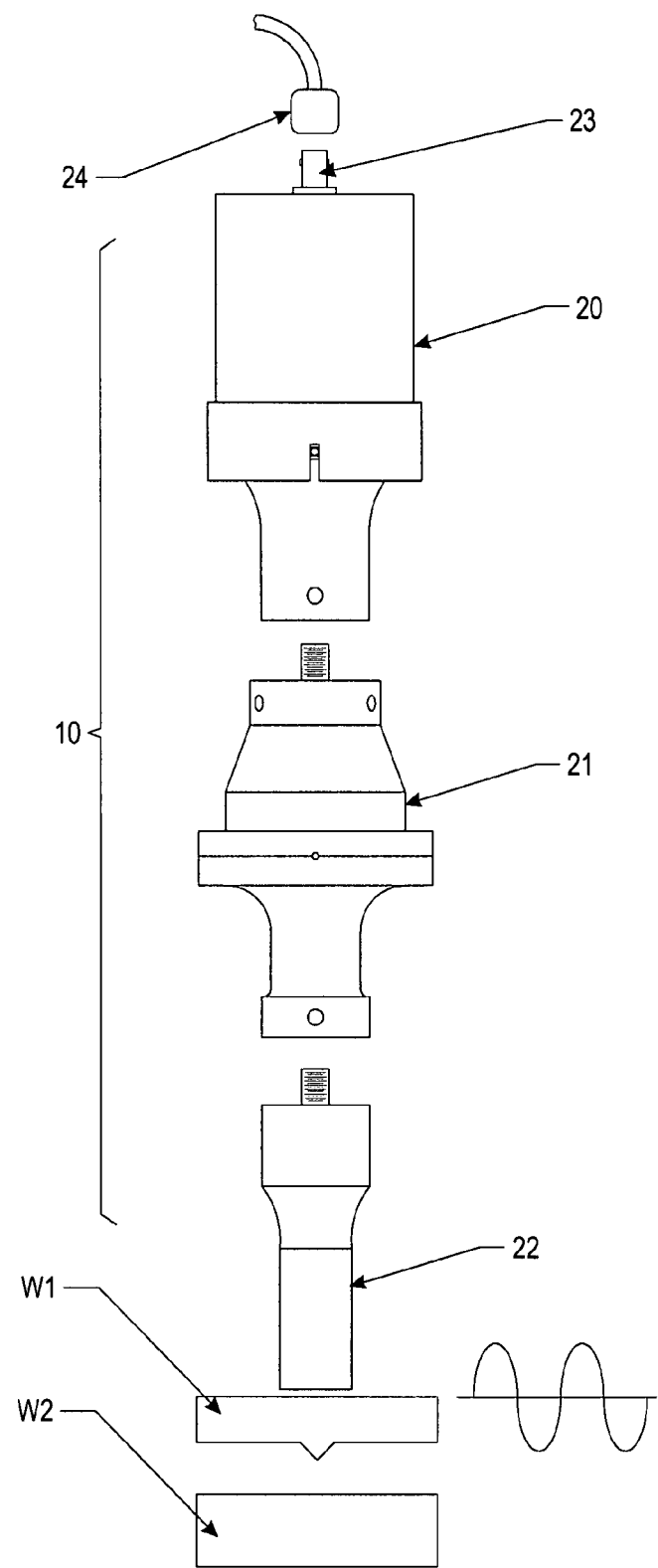
FIG. 5 is an enlarged, exploded elevation of the ultrasonic "stack" in the ultrasonic welding machine shown in FIGS. 1 and 2.
Figure 6:
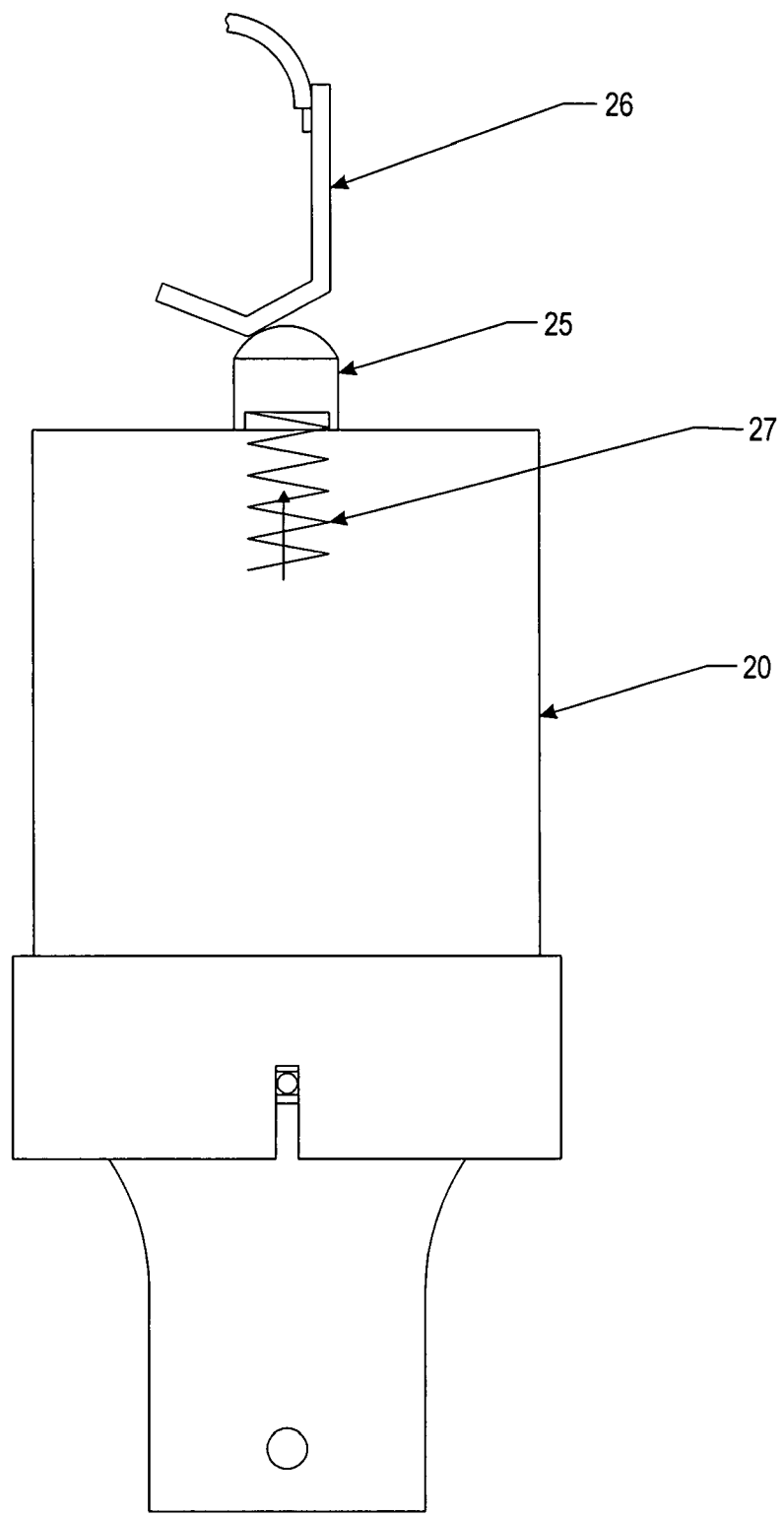
FIG. 6 is an variation of FIG. 5 showing a spring-loaded contact button which remains pressed against a contact bar.

As shown in FIG. 5, the transducer 20 includes a connector 23 for attaching a high voltage coaxial cable 24 that delivers a high-frequency electrical signal for exciting the transducer 20. This signal is supplied by a separate ultrasonic signal generator (not shown). An alternative method of connection can also be utilized to permit easier removal and installation of the transducer. This method as shown in FIG. 6 utilizes a spring mounted button on the transducer 20 which contacts a conductive bar on the press. Electrical conductivity is insured by the spring force behind the button as it presses against the bar.

The transducer 20 generates the ultrasonic vibrations as a Langevin piezoelectric converter that transforms electrical energy into mechanical movement. Power applied to the transducer 20 can range from less than 50 Watts up to 5000 Watts at a typical frequency of 20 kHz. Note that the same concepts will hold true for transducers of other frequencies and power levels which are regularly used in the welding processes of this invention.

The transducer 20 is typically made from a number of standard piezoelectric ceramic elements separated by thin metal plates, clamped together under high pressure. When an alternating voltage is applied to the ceramic elements, a corresponding electric field is produced which results in a variation in thickness of the ceramic elements. This variation in thickness induces a pressure wave that propagates through the material and is reflected by the ends of the metal mass of the transducer. When the length of the assembly is tuned to its frequency of excitation, the assembly resonates and becomes a source of standing waves. The output amplitude from a 20-kHz transducer is typically about 20 microns (0.0008 inches). This amplitude needs to be amplified by the booster 21 and the horn 22 to do useful work on the parts W1 and W2. The booster and horn act as an acoustic waveguide or transformer to amplify and focus the ultrasonic vibrations to the work piece.

The primary function of the booster 21 is to alter the gain (i.e., output amplitude) of the stack 10. A booster is amplifying if its gain is greater than one and reducing if its gain is less than one. Gains at 20-kHz typically range from less than one-half to about three.

The horn 22 cannot normally be clamped because it must be free to vibrate and thus only the transducer 20 and the booster 21 are secured. Thus, a secondary function (and sometimes the sole purpose) of the booster is to provide an additional mounting location without altering the amplification of the stack when secured in a press. The neutral or coupling booster is added between the transducer and horn and mounted in the press by a mounting ring which is placed at the nodal point (where the standing wave has minimal longitudinal amplitude).

The horn 22 has three primary functions, namely:

1. It transfers the ultrasonic mechanical vibrational energy (originating at the transducer 20) to the thermoplastic work piece (W1 and W2) through direct physical contact, and localizes the energy in the area where the melt is to occur.

2. It amplifies the vibrational amplitude to provide the desired tip amplitude for the thermoplastic workpiece and welding process requirements.

3. It applies the pressure necessary to force the weld when the joint surfaces are melted.

The horn is precision machined and is typically designed to vibrate at either 15 kHz, 20 kHz, 30 kHz, 40 kHz, 50 kHz or 70 kHz. The higher the frequency, the shorter the acoustic wavelength, and consequently the smaller the horn. The tuning of a horn is typically accomplished using electronic frequency measurement. Horns are usually manufactured from high-strength aluminum alloys or titanium, both of which have excellent acoustical properties to transmit the ultrasonic energy with little attenuation.

There are many different horn shapes and styles depending on the process requirements. Factors which influence the horn design are the materials to be welded and the method of assembly. The horn must amplify the mechanical vibration so that the amplitude is sufficient to melt the thermoplastic workpieces at their interface, and the gain of the horn is determined by its profile. The amplitude at the tip of the horn typically ranges from 30 to 125 microns peak to peak (1.2 to 5.0 thousandths of an inch) at 20 kHz. In an alternate variation, the horn can be designed so that it takes the form of a booster and combines the functions of stabilization and welding. In this variation, the booster is eliminated and the horn is secured in the press in the position of the booster mounting ring area.

As the frequency increases, the vibration amplitude decreases. Higher frequencies are used for seaming of thin materials and delicate parts that do not require a lot of amplitude. Since the horn becomes smaller at higher frequencies, closer spacing can also be achieved.

Plastic welding is the most common application of ultrasonic assembly. To perform ultrasonic plastic welding, the tip of the horn is brought into contact with the upper workpiece W1, as shown in FIGS. 5 and 6. Pressure is applied and ultrasonic energy travels through the upper workpiece, increasing the kinetic energy (or heat) at the contact point of the two workpieces. The heat melts a molded ridge of plastic on one of the workpieces, and the molten material flows between the two surfaces. When the vibration stops, the material solidifies forming a permanent bond.

The linear actuator 11 comprises an electric servo motor 30 integrated with a converter 31 that converts the rotating output of the motor 30 into linear motion. The converter is typically a lead screw coupled to the motor output shaft 30a, with a follower unit traveling along the threads of the lead screw to produce the desired linear output. In the illustrative embodiment, the linear output is controlled vertical movement of a rod 31a that connects the converter 31 to the stack 10. The integrated unit that contains both the servo motor 30 and the converter 31 is a commercially available item, such as the SR, GSM, or GSX Series linear actuators available from Exlar Corporation of Chanhassen, Minn. See also U.S. Pat. No. 5,557,154 assigned to Exlar Corporation.

Figure 4:
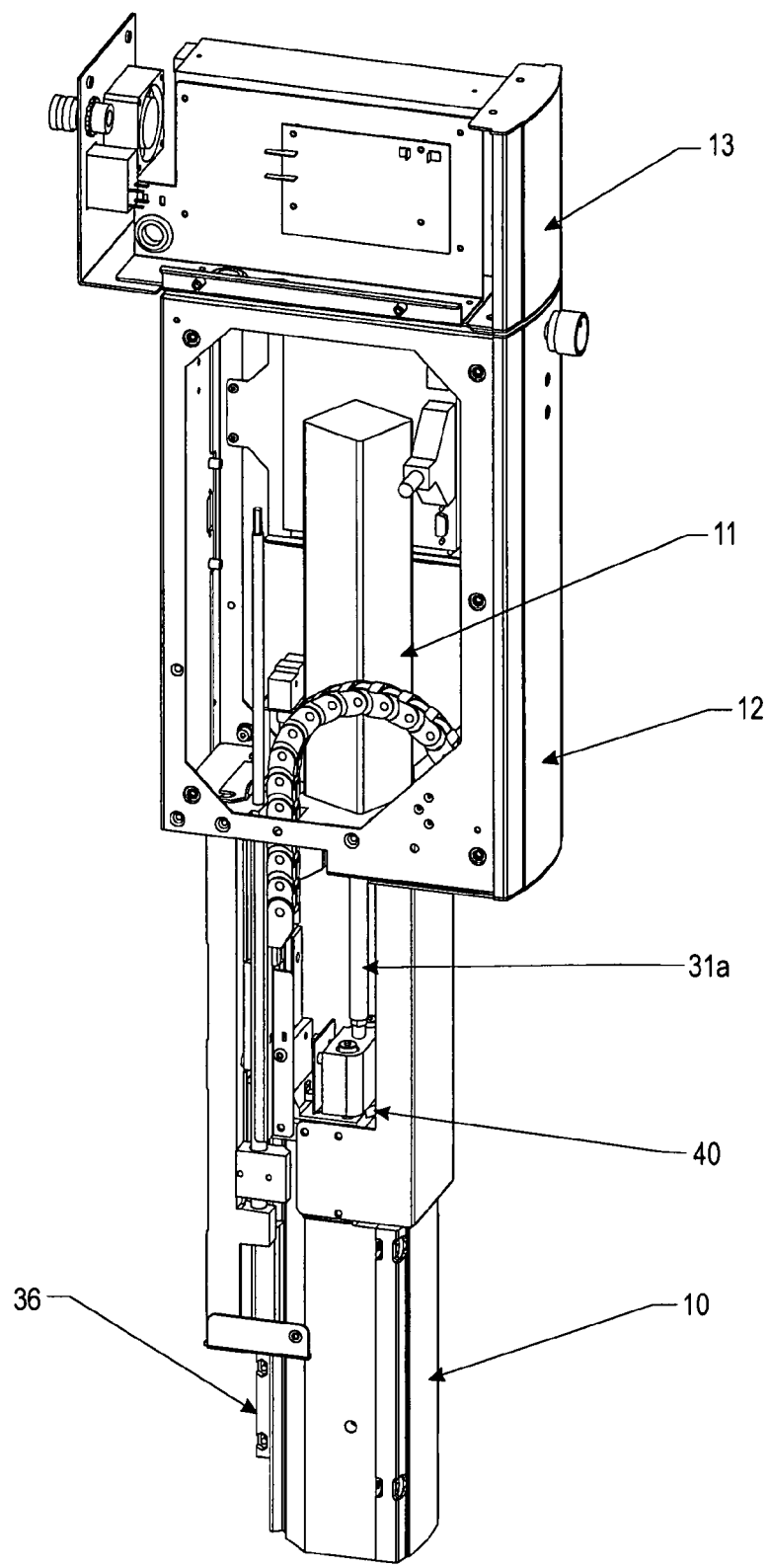
FIG. 4 is a variation of FIG. 2 showing a load cell used for force feedback.

As can be seen in FIGS. 2 and 4, the actuator rod 31a moves linearly along a vertical axis. The lower end of the rod 31a is connected to the components comprising the carriage to which the ultrasonic welding stack 10 is attached. The purpose of the actuator 11 is to apply a controlled force, speed, or a combination of force and speed to the stack 10 to press the stack downwardly against the workpiece W1 while the stack is also transmitting mechanical vibrations to the workpiece. The linear movement of the rod 31a is also controlled so that the weld thickness is controlled, especially after the thermoplastic material of the workpieces has been softened sufficiently to effect the desired weld. Excessive advancement of the rod 31a after the thermoplastic material has been softened by the applied vibrating energy can produce a weld that is too thin and, therefore, too weak.

Figure 3:
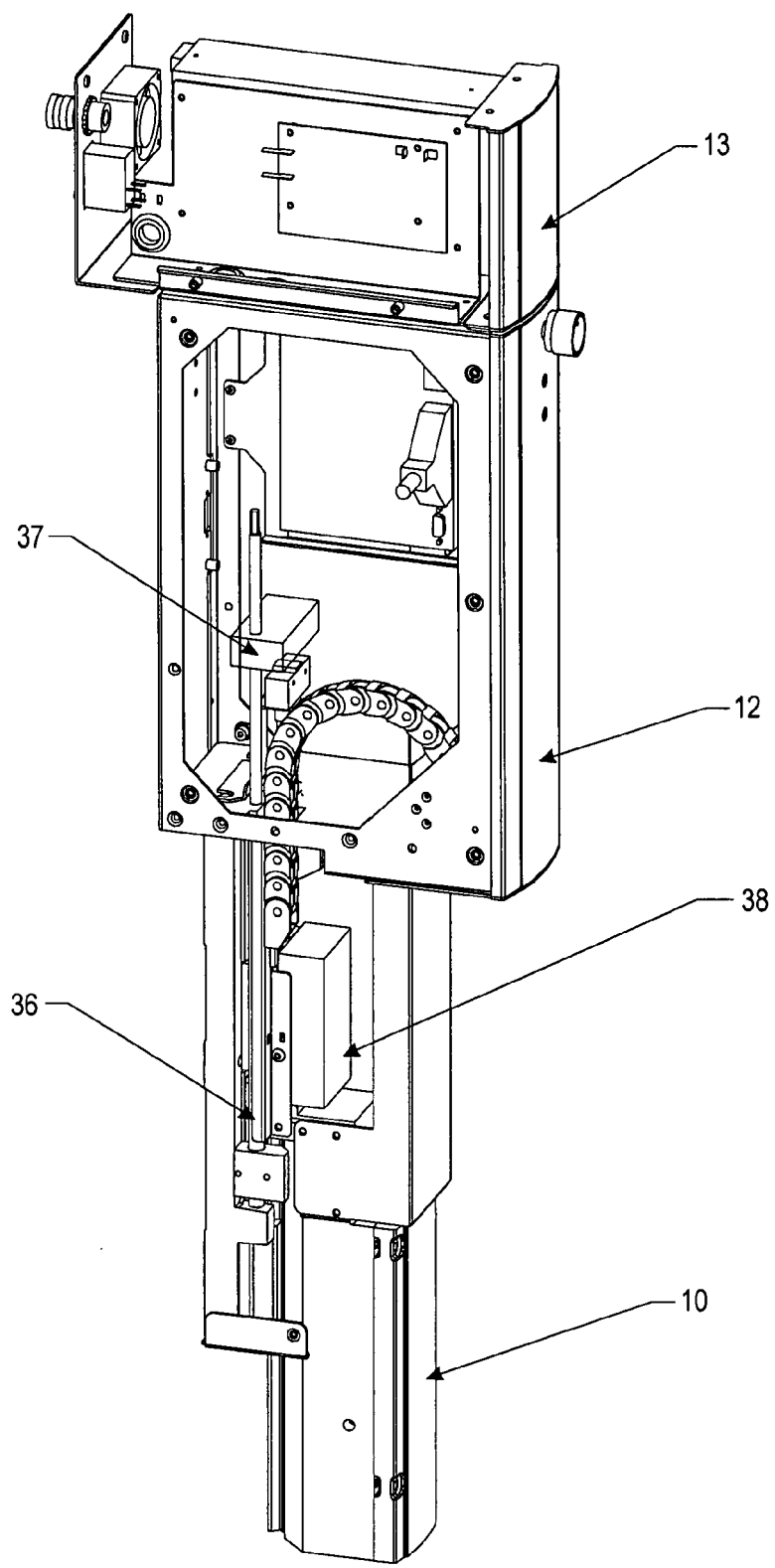
FIG. 3 is a variation of FIG. 2 showing a linear motor drive in place of the servo-motor driven actuator.

An alternative method of driving the welding stack is shown in FIG. 3 by the use of a direct drive linear servo slide. These slides reduce inaccuracies caused by gear backlash and power screw wrap up. A direct drive linear servo motor 38 acts on the stack assembly 10. This linear drive servo motor is a combination of the motor 30 and the converter 31. Such drives are commercially available from a number of suppliers such as the Parker Trilogy 410 Series. The position feedback 36 is provided directly by the linear motor, e.g., using an encoder or resolver coupled directly to the motor shaft. In order to use a linear servomotor in a vertical configuration, a separate, electric brake 37 is required to keep the welding stack 10 from falling under its own weight during power off conditions.

Figure 7:
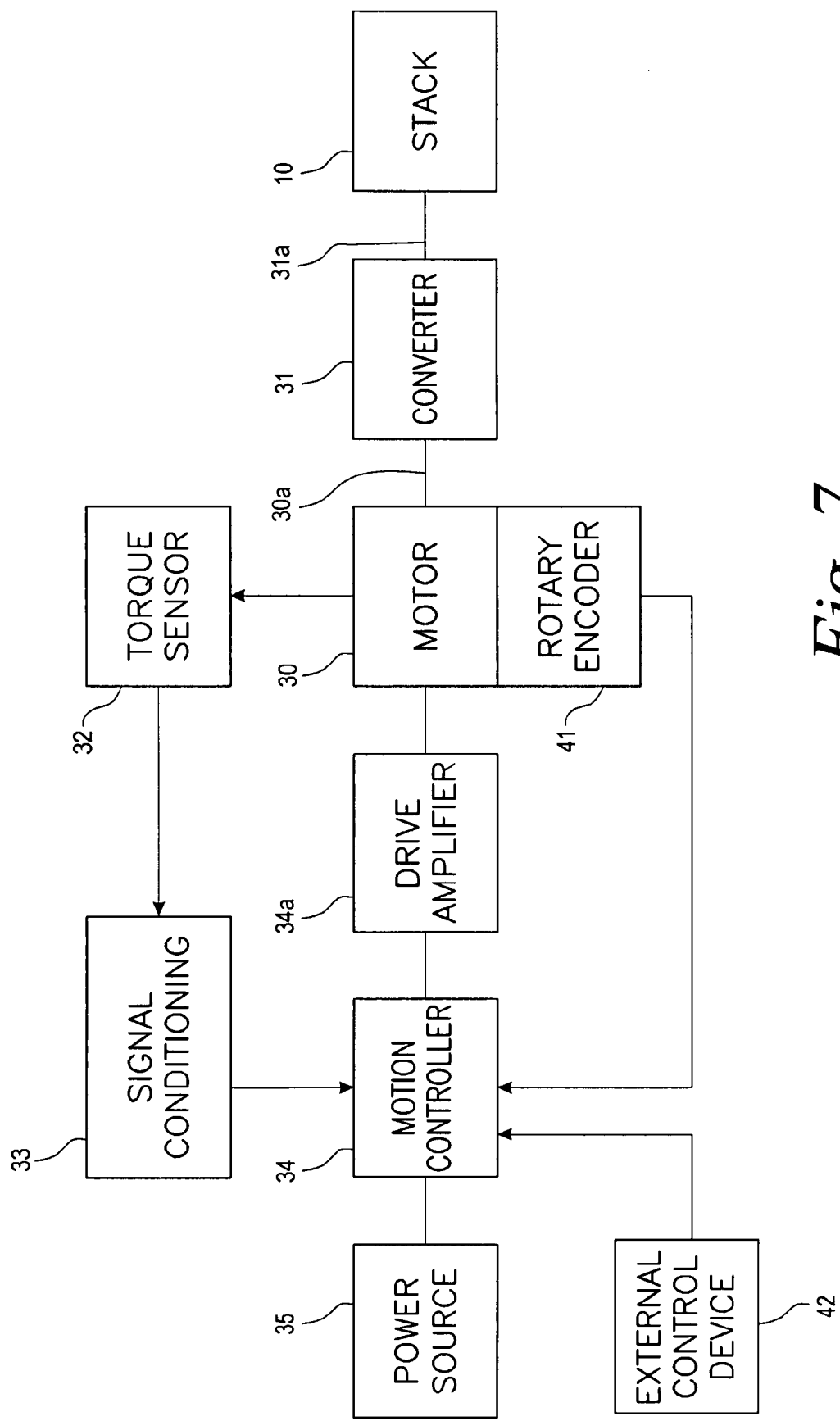
FIG. 7 is a block diagram of one embodiment of a control system for the linear actuator used in the ultrasonic welding machine shown in FIGS. 1-3.

FIG. 7 illustrates a control system for the linear actuator 11. A force control loop includes a torque sensor 32 coupled to the rotary output shaft 30a of the electrical servo motor 30, for producing an electrical signal related to the magnitude of the torque output of the motor 30. This torque signal is processed in conventional signal conditioning circuitry 33 and then supplied to a motion controller 34 that receives power from a power source 35 and controls the electrical current supplied to the motor 30 via drive amplifier 34A. Thus, the torque sensor 32 and the signal conditioning circuitry 33 form a feedback loop that controls the motor 30 to turn the output shaft 30a with a desired torque, which in turn controls the force applied to the stack 10 by the converter 31 that converts the rotary output of the motor 30 to linear motion of the rod 31a. This feedback loop makes it possible to control the pressure applied to the workpieces during the welding operation by controlling the output torque produced by the servo motor.

Figure 8:
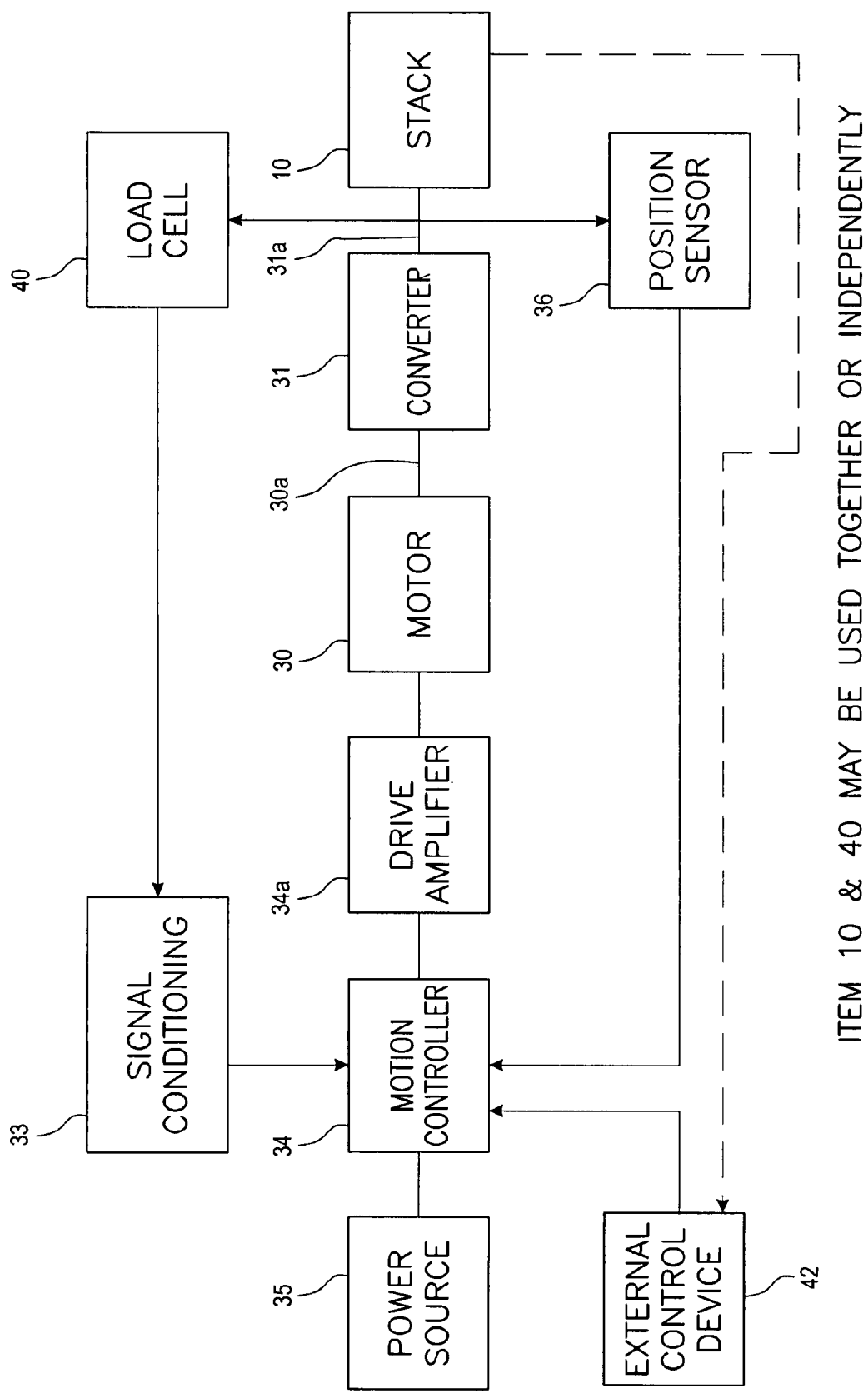
FIG. 8 is a block diagram of one embodiment of a control system for the linear actuator used in the ultrasonic welding machine shown in FIG. 4.

An alternate method of providing force feedback to the control system uses a commercially available load cell in place of torque control on the motor drive itself. The load cell is positioned so that it can measure the force exerted by the welding stack upon the work piece. This is illustrated in FIG. 8.

To control the magnitude of the linear displacement of the rod 31a, a position sensor 36 is coupled to the rod 31a, for producing an electrical signal related to the vertical movement of the rod 31a. For example, the position sensor 36 may be an encoder that produces a number of electrical pulses proportional to the magnitude of the displacement of the rod 31a. This position signal is supplied to the controller 34 as a further parameter for use by the controller 34 in controlling the electrical current supplied to the motor 30. Thus, the position sensor 36 is part of a feedback loop that controls the motor 30 to control the angular displacement of the output shaft 30a, which in turn controls the magnitude of the vertical movement of the rod 31a, and thus of the stack 10. The actual displacement of the stack 10 is, of course, a function of both the force applied by the motor 30 and the resistance offered by the workpieces, which varies as the weld zone is heated and softens the thermoplastic material of the workpieces.

An alternate method of determining the linear position of the welding stack during the welding cycle is by utilizing the encoder feedback of the motor. This is represented by item 41 in FIG. 7 or item 36 in FIG. 8. This position is a function of motor position and the drive screw nut lead in combination with any gear reduction used in the drivetrain.

In addition to controlling the force, speed, or combination of force and speed directly, the motion control system 34 is capable of automatically changing the force or speed on-the-fly based on an arbitrary algorithm using an input signal or combination of signals from an external control device 42. The external control device 42 may be the ultrasonic generator or controller which provides power and control to the stack 10. It may be a controller which is connected to or involved with the workpieces W1 and W2. In these instances the motion controller 34 receives the input signal(s) from an external device 42, signal conditioner 33, and position sensor 36 and generates the force or speed changes during the welding and holding processes. For example, the actuator can be commanded to automatically change speed in an effort to maintain ultrasound power output (provided by ultrasonic generator) constant. As a second example, the ultrasonic transducer 20 may provide feedback power to an external control device 42 related to the force being exerted upon it. This feedback power will be used as a basis for the external control device to influence the motion controller 34 to increase the force or speed of the motor and actuator 30 and 31. The result will be a closed servo-control loop relating the force applied to the workpiece W1 and W2 and the actual welding speed as reported by either or both of the position sensors 36 and 41.

Figure 9:
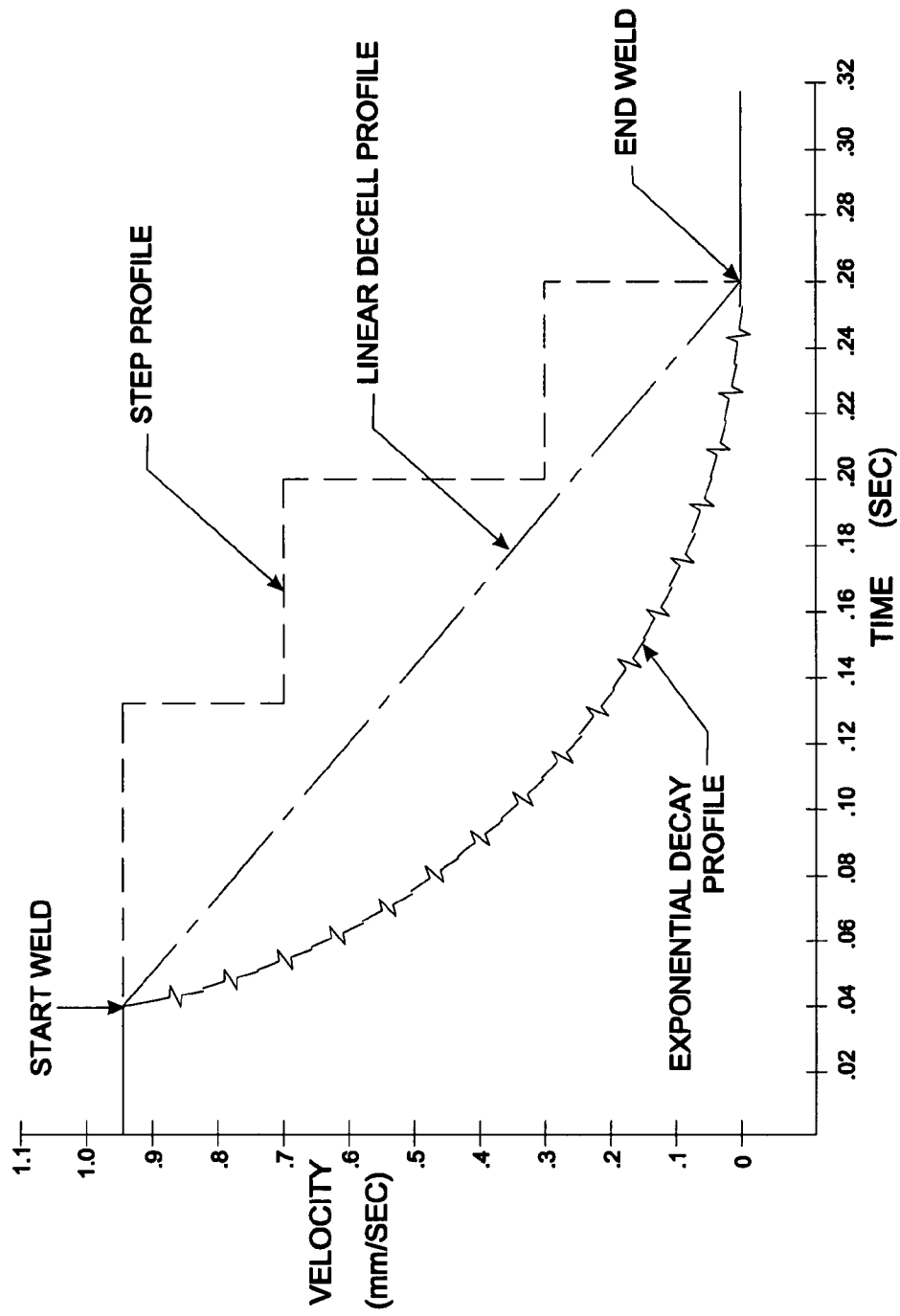
FIG. 9 shows a variety of velocity profiles which can be programmed into the apparatus for the purpose of obtaining optimum welding strength.
Figure 10:
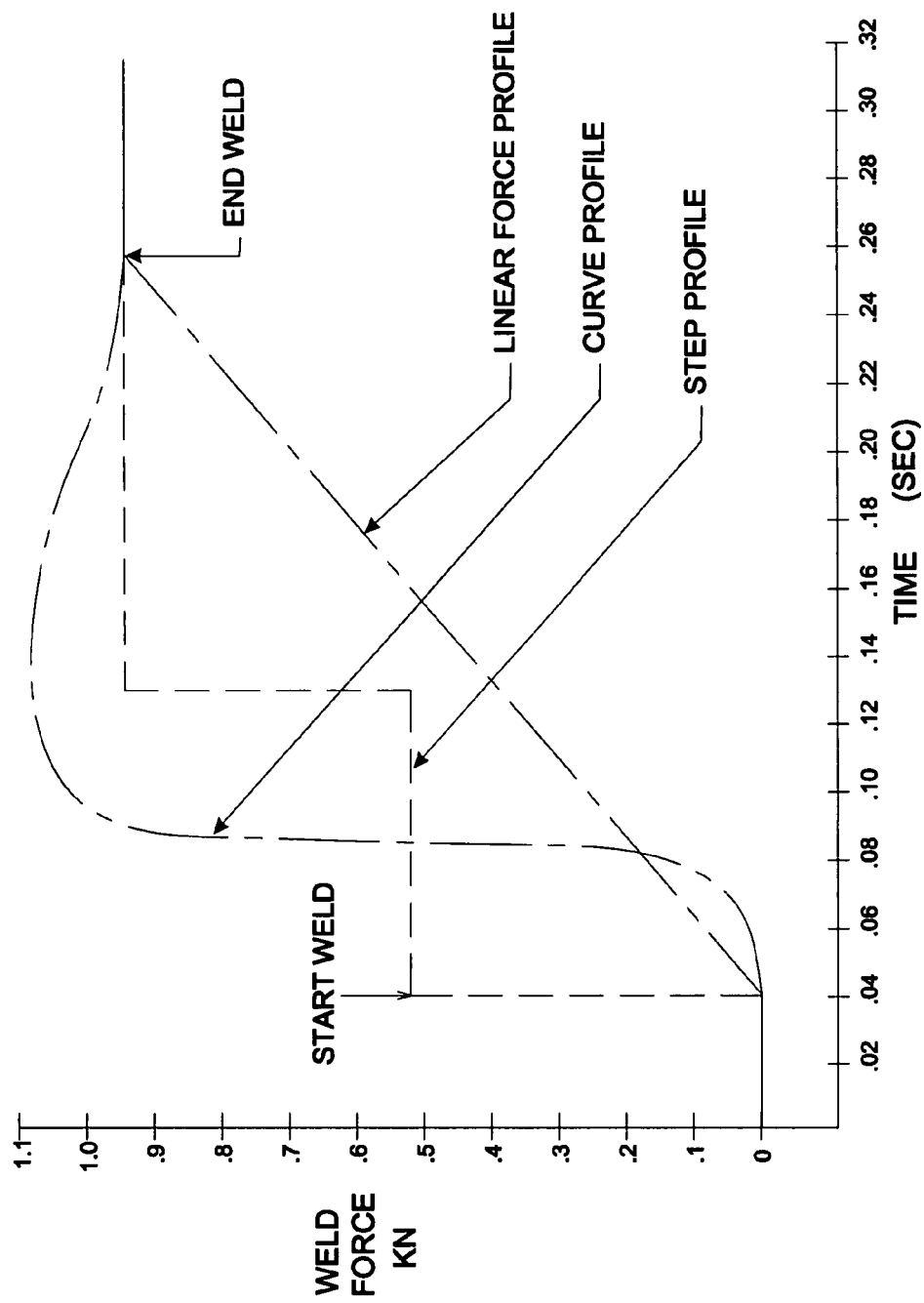
FIG. 10 shows a variety of force profiles which can be programmed into the apparatus for the purpose of obtaining optimum welding strength.
Figure 11:
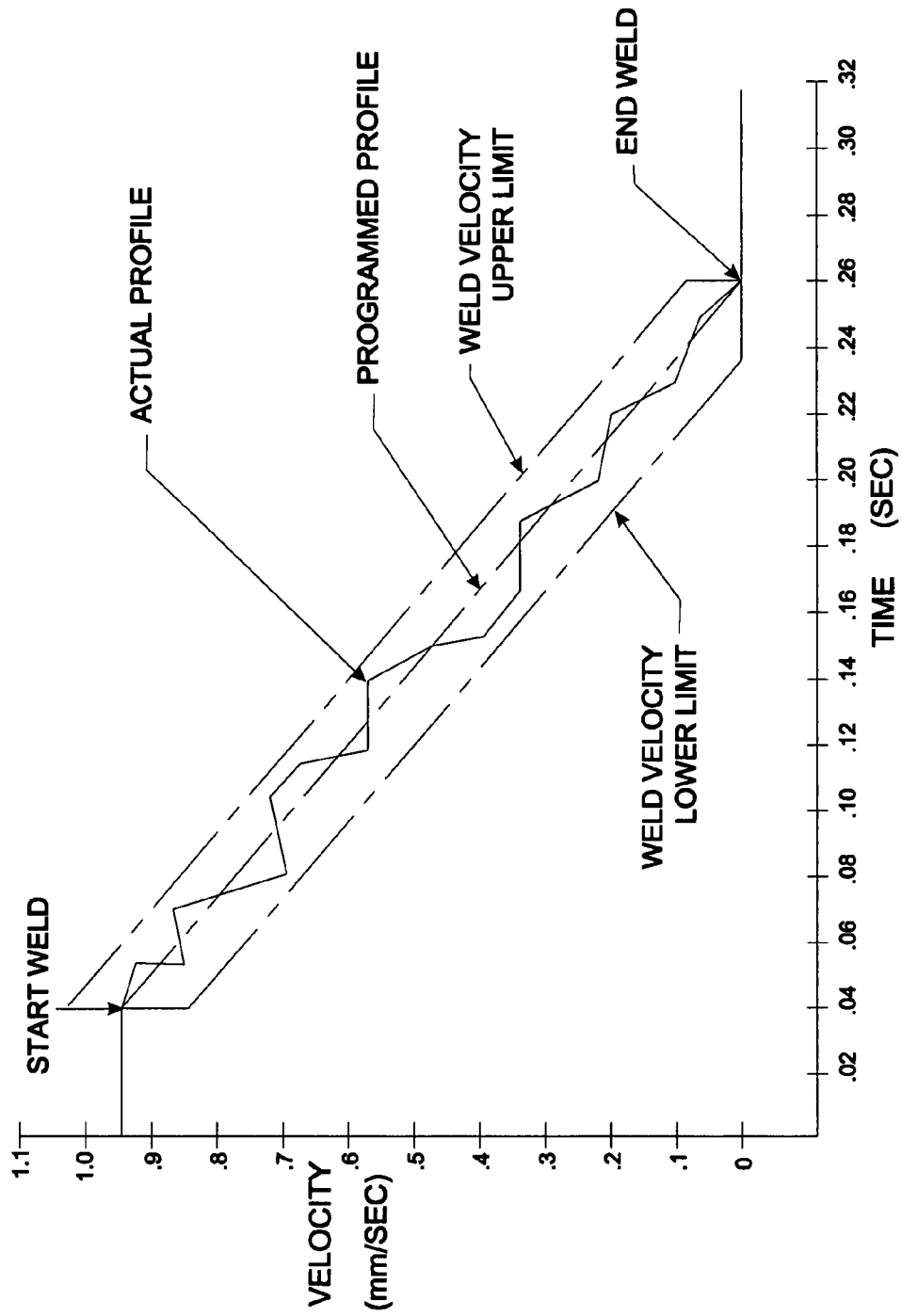
FIG. 11 shows an example of a weld obtained using upper and lower limits and a programmed velocity profile.

There are numerous advantages of using servo-electric control in a welding system of this type. The force exerted by the welding stack can be more precisely controlled due to the repeatable and controllable nature of electrical power in comparison with pneumatic systems. There is no media compressibility as in pneumatic systems which leads to inaccuracies of force and position of the welding stack. The application of electrical power and ability to change from one force level to another can be accomplished faster with a servo-controlled electric control scheme than using a pneumatic system. One such control scheme is illustrated in FIG. 9. In this scheme, a variety of weld velocity profiles are shown. The use of a servo-controlled electric drive permits this type of control. A second control scheme is shown in FIG. 10. In this scheme, a variety of welding force profiles are shown. Specific force and speed profiles can be programmed into a welding apparatus, e.g., by storing the profiles in memory associated with the controller. Different welding force and speed profiles allow parts to be welded under optimal welding conditions. The feedback of the actual welding profile can be compared to the user-programmed profile to determine acceptability of welds. This feedback scheme is illustrated in FIG. 11. An actual welding profile is shown as a solid line with upper and lower welding limits denoted by dashed lines. It can be verified that at no time does the actual weld speed vary beyond the control limits of the process. These actual weld profiles can be stored, downloaded to other devices and serve as a computational signature of the welded assembly. The control of the welding process can be initiated by many different parameters. The parameters include, but are not limited to: part contact position, distance, force preload on part, time, predefined threshold of ultrasonic power draw on the generator, motor torque and cumulative energy consumed by the part at a low ultrasonic idle power. Once the welding has started, any of the aforementioned parameters can be used to complete the weld process with the addition of velocity or weld force profile control.

It is also possible to combine the effects of the speed and force feedback to control the weld process. An example of this is monitoring and varying the speed as a secondary control in order to hold a constant force exerted by the servo motor on the part. In this scenario a maximum and minimum welding speed can be defined to ensure that all parts have a well defined envelope of process parameters. The reciprocal method of varying the force exerted by the servo motor within defined limits to maintain a predetermined velocity profile is also viable with this apparatus and the control capabilities inherent in the design.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. Ultrasonic welding apparatus comprising
an ultrasonic welding stack mounted for linear movement and applying a controlled force, speed, or a combination of force and speed to a first workpiece to urge said first workpiece against a second workpiece to which said first workpiece is to be joined,
an electrically powered linear actuator coupled to said ultrasonic welding stack for moving said stack while applying a controlled force, speed, or a combination of force and speed to said stack, said actuator including an electrical servo motor producing rotational mechanical motion, and a converter integrated with said servo motor for converting said rotational motion into linear motion of an output shaft,
a position sensor coupled to said actuator and producing an electrical output signal representing the actual position of said output shaft, and
a controller receiving said electrical output signal from said position sensor and controlling the force applied to said stack by said actuator or the speed of said actuator.

2. The ultrasonic welding apparatus of claim 1 wherein said position sensor is external of said actuator and coupled to said output shaft.

3. The ultrasonic welding press of claim 1 which includes a motion controller coupled to said linear actuator for controlling the force applied by said actuator to said ultrasonic welding stack.

4. The ultrasonic welding press of claim 3 which includes a torque sensor coupled to said servo motor for producing a signal related to the torque produced by said servo motor and supplying said signal to said controller, and said controller controls the electrical power delivered to said servo motor so as to control the torque output of said motor.

5. The ultrasonic welding apparatus of claim 3 which includes a load cell coupled between said converter and said stack and producing a control signal corresponding to the force exerted by the welding stack upon a workpiece, and a feedback loop coupling said load cell to said controller for supplying said control signal to said controller.

6. The ultrasonic welding apparatus of claim 3 which includes an external control device coupled to said controller to produce at least one input signal to said controller to adjust the force or speed of said actuator on-the-fly based on an algorithm using said input signal.

7. The ultrasonic welding apparatus of claim 3 which includes an external control device coupled to said controller to produce at least one input signal to said controller representing a secondary welding parameter of force or speed for a prescribed welding operation to adjust the force or speed of said actuator.

8. The ultrasonic welding apparatus of claim 1 which includes a motion controller coupled to said actuator for controlling the force applied to said stack by said actuator, and a feedback loop coupling said position sensor to said controller for supplying said electrical output signal to said controller.

9. The ultrasonic welding apparatus of claim 1 which includes
a memory for storing data representing desired velocity and force profiles for prescribed welding operations,
at least one transducer producing a control signal corresponding to either the actual velocity of movement of said stack or the actual force exerted by said stack upon a workpiece, and
a motion controller coupled to said actuator for controlling at least one of the force applied to said stack by said actuator and the velocity of movement of said stack, said controller being programmed to compare said control signal with said stored data.

10. The ultrasonic welding apparatus of claim 1 which includes
a memory for storing data representing desired velocity and force profiles for prescribed welding operations,
at least one transducer producing a control signal corresponding to either the actual velocity of movement of said stack or the actual force exerted by said stack upon a workpiece, and
a motion controller coupled to said actuator for controlling at least one of (1) the force applied to said stack by said actuator and (2) the velocity of movement of said stack, during a post-welding stage, said controller being programmed to compare said control signal with said stored data.

* * * * *